(12) United States Patent
van de Waerdt (10) Patent No.: US 9,342,196 B2
(45) Date of Patent: May 17, 2016

(54) HARDWARE ACCELERATOR FOR TOUCHSCREEN DATA PROCESSING

(71) Applicant: PARADE TECHNOLOGIES, LTD., Santa Clara, CA (US)

(72) Inventor: Jan-Willem van de Waerdt, San Jose, CA (US)

(73) Assignee: PARADE TECHNOLOGIES, LTD., Santa Clara, CA (US)

( * ) Notice: Subject to any disclaimer, the term of this patent is extended or adjusted under 35 U.S.C. 154(b) by 0 days.

(21) Appl. No.: 13/829,734

(22) Filed: Mar. 14, 2013

(65) Prior Publication Data
US 2014/0022206 A1    Jan. 23, 2014

Related U.S. Application Data

(60) Provisional application No. 61/673,336, filed on Jul. 19, 2012, provisional application No. 61/673,350, filed on Jul. 19, 2012, provisional application No. 61/781,986, filed on Mar. 14, 2013, provisional application No. 61/782,139, filed on Mar. 14, 2013.

(51) Int. Cl.
*G06F 3/044* (2006.01)
*G06F 3/041* (2006.01)

(52) U.S. Cl.
CPC .............. *G06F 3/044* (2013.01); *G06F 3/0416* (2013.01)

(58) Field of Classification Search
CPC ........................................................ G06F 3/044
USPC ................................................. 345/173–179
See application file for complete search history.

(56) References Cited

U.S. PATENT DOCUMENTS

| 5,566,341 | A | 10/1996 | Roberson et al. | |
|---|---|---|---|---|
| 7,693,929 | B2 | 4/2010 | Giacalone | |
| 8,059,102 | B2 | 11/2011 | Rimon et al. | |
| 2011/0270112 | A1 | 11/2011 | Manera et al. | |
| 2012/0194472 | A1 | 8/2012 | Dacosta et al. | |
| 2012/0268416 | A1 | 10/2012 | Pirogov et al. | |
| 2013/0169561 | A1* | 7/2013 | Park et al. | 345/173 |
| 2013/0222210 | A1* | 8/2013 | Wang et al. | 345/2.3 |
| 2013/0257799 | A1* | 10/2013 | Lamont et al. | 345/174 |

FOREIGN PATENT DOCUMENTS

EP    1912202 A    4/2008

OTHER PUBLICATIONS

Intel Atom Processor E6xx Series Datasheet, Intel Corporation, Document No. 324208, Revision 004US, Jul. 2011, 298 pages.
Styles, Harry, "Hardware Acceleration of Large Scale Capacitance Calculation," [retrieved from Jul. 3, 2014], retrieved from internet <URL: ftp://cm.bell-labs.com/who/Old/mencer/henryreport.pdf>; 6 pages.

* cited by examiner

*Primary Examiner* — Dennis Joseph
(74) *Attorney, Agent, or Firm* — Morgan, Lewis & Bockius LLP (57) ABSTRACT

A contact's interaction with a sensing array is subject to several external and internal stimuli which may impact a processing unit's confidence in the characteristics of that interaction or the presence of the interaction itself. Fidelity of user action is greatly improved with a step-wise and holistic analysis of a contact on an array of capacitance sensors, which allows for repetition of certain steps of processing or the entire operation if threshold confidence levels are not achieved.

12 Claims, 13 Drawing Sheets

HARDWARE ACCELERATOR FOR TOUCHSCREEN DATA PROCESSING

RELATED APPLICATIONS

This application claims the benefit of U.S. Provisional Application Nos. 61/781,986 and 61/782,139, filed on Mar. 14, 2013, U.S. Provisional Application Nos. 61/673,336 and 61/673,350 filed on Jul. 19, 2012, which are incorporated by reference herein.

TECHNICAL FIELD

This disclosure relates to the field of touch-sensors and, in particular, touch location detection.

BACKGROUND

Computing devices, such as notebook computers, personal data assistants (PDAs), kiosks, and mobile handsets, have user interface devices, which are also known as human interface devices (HID). One user interface device that has become more common is a touch-sensor pad (also commonly referred to as a touchpad). A basic notebook computer touch-sensor pad emulates the function of a personal computer (PC) mouse. A touch-sensor pad is typically embedded into a PC notebook for built-in portability. A touch-sensor pad replicates mouse X/Y movement by using two defined axes which contain a collection of sensor elements that detect the position of one or more conductive objects, such as a finger or a stylus pen. Mouse right/left button clicks can be replicated by two mechanical buttons, located in the vicinity of the touchpad, or by tapping commands on the touch-sensor pad itself. The touch-sensor pad provides a user interface device for performing such functions as positioning a pointer, or selecting an item on a display. These touch-sensor pads may include multi-dimensional sensor arrays for detecting movement in multiple axes. The sensor array may include a one-dimensional sensor array, detecting movement in one axis. The sensor array may also be two dimensional, detecting movements in two axes.

Another user interface device that has become more common is a touch screen. Touch screens, also known as touchscreens, touch windows, touch panels, or touchscreen panels, are transparent display overlays which are typically either pressure-sensitive (resistive or piezoelectric), electrically-sensitive (capacitive), acoustically-sensitive (surface acoustic wave (SAW)) or photo-sensitive (infra-red). The effect of such overlays allows a display to be used as an input device, removing the keyboard and/or the mouse as the primary input device for interacting with the display's content. Such displays can be attached to computers or, as terminals, to networks. Touch screens have become familiar in retail settings, on point-of-sale systems, on ATMs, on mobile handsets, on kiosks, on game consoles, and on PDAs where a stylus is sometimes used to manipulate the graphical user interface (GUI) and to enter data. A user can touch a touch screen or a touch-sensor pad to manipulate data. For example, a user can apply a single touch, by using a finger to touch the surface of a touch screen, to select an item from a menu.

BRIEF DESCRIPTION OF THE DRAWINGS

The present disclosure is illustrated by way of example, and not by way of limitation, in the figures of the accompanying drawings.

DETAILED DESCRIPTION

The following description sets forth numerous specific details such as examples of specific systems, components, methods, and so forth, in order to provide a good understanding of several embodiments of the present invention. It will be apparent to one of ordinary skill in the art, however, that at least some embodiments of the present invention may be practiced without these specific details. In other instances, well-known components or methods are not described in detail or are presented in a simple block diagram format in order to avoid unnecessarily obscuring the present invention. Thus, the specific details set forth are merely exemplary. Particular implementations may vary from these exemplary details and still be contemplated to be within the spirit and scope of the present invention. Reference in the description to "one embodiment" or "an embodiment" means that a particular feature, structure, or characteristic described in connection with the embodiment is included in at least one embodiment of the disclosure. The phrase "in one embodiment" located in various places in this description does not necessarily refer to the same embodiment.

An embodiment of a capacitive sensor array may include sensor elements arranged such that each unit cell corresponding to an intersection between sensor elements may include a main trace and one or more primary subtraces branching away from the main trace. In one embodiment, a sensor element may also include one or more secondary subtraces branching from a primary subtrace, or one or more tertiary subtraces branching from a secondary subtrace. In one embodiment, a sensor array having such a pattern may have decreased signal disparity and reduced manufacturability problems as compared to other patterns, such as a diamond pattern. Specifically, a capacitive sensor array with sensor elements having main traces and subtraces branching from the main trace, such as a totem pole pattern, may be manufactured with decreased cost and increased yield rate, as well as improved optical quality.

An embodiment of such a capacitive sensor array may include a first and a second plurality of sensor elements each intersecting each of the first plurality of sensor elements. Each intersection between one of the first plurality of sensor elements and one of the second plurality of sensor elements may be associated with a corresponding unit cell. A unit cell may be a single node or pixel of capacitance measurement on the capacitive sensor array. In one embodiment, a unit cell corresponding to an intersection may be understood as an area including all locations on the surface of the sensor array that are nearer to the corresponding intersection than to any other intersection between sensor elements.

In one embodiment of a capacitive sensor array, each of the second plurality of sensor elements includes a main trace that crosses at least one of the plurality of unit cells, and further includes, within each unit cell, a primary subtrace that branches away from the main trace. In one embodiment, the primary subtrace may be one of two or more primary subtraces branching symmetrically from opposite sides of the main trace, resembling a "totem pole". Alternatively, the primary subtraces may branch asymmetrically from the main trace.

Figure 1:
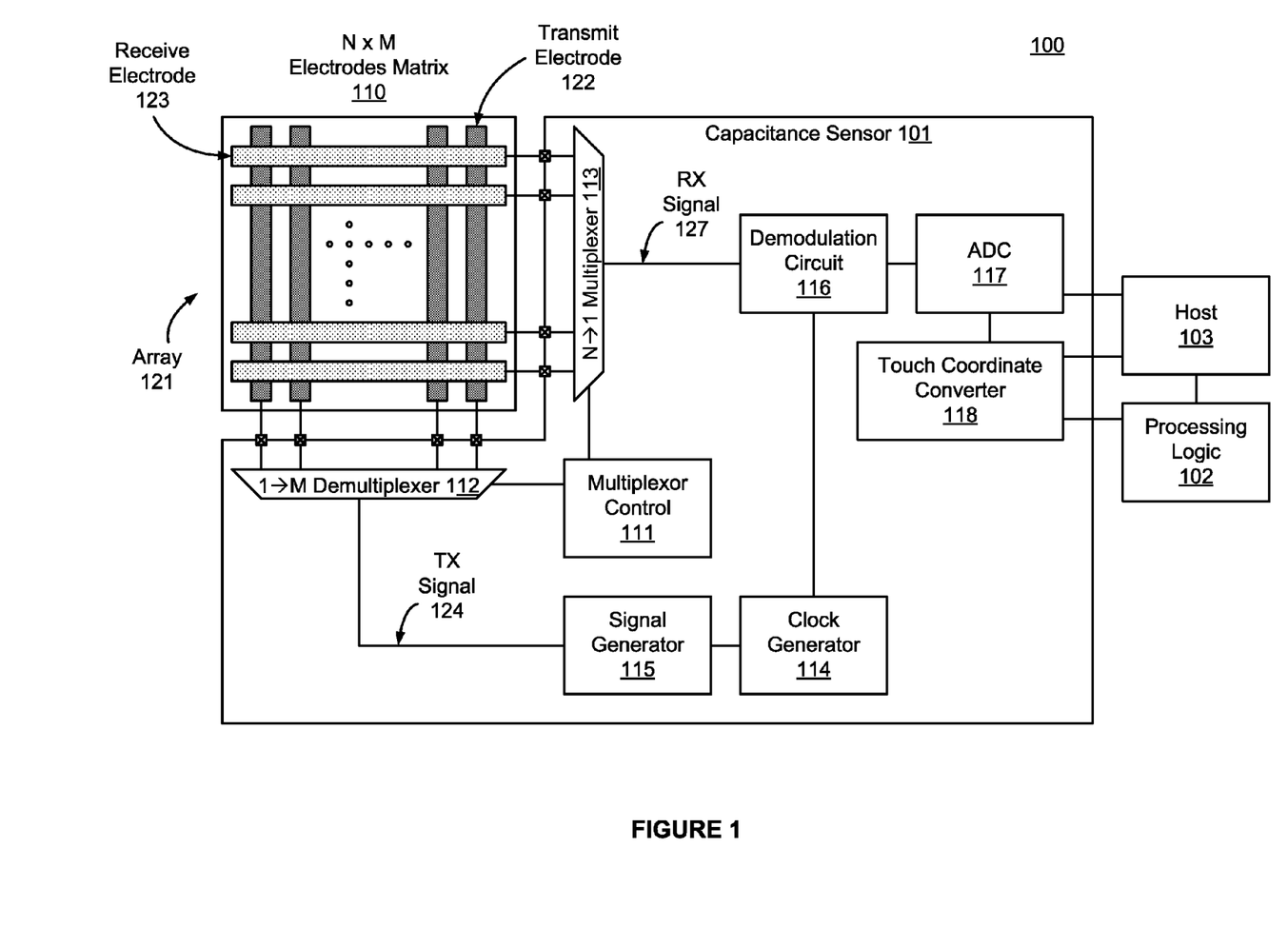
FIG. 1 is a block diagram illustrating an embodiment of an electronic system that processes touch sensor data.

FIG. 1 is a block diagram illustrating one embodiment of a capacitive touch sensor array 121 and a capacitance sensor 101 that converts measured capacitances to coordinates. The coordinates are calculated based on measured capacitances. In one embodiment, touch sensor array 121 and capacitance sensor 101 are implemented in a system such as electronic system 100. Electronic system 100 may be a touchscreen or touchpad, which may part of a mobile phone, a tablet PC, a laptop PC or other computing device. The electronic system may also be a front panel display with an array of buttons with sensing electrodes tied to each one specifically or in a matrix. Touch sensor array 121 includes a matrix 110 of N×M electrodes (N receive electrodes and M transmit electrodes), which further includes transmit (TX) electrode 122 and receive (RX) electrode 123. Each of the electrodes in matrix 110 may be connected with capacitance sensor 101 through demultiplexer 112 and multiplexer 113.

Capacitance sensor 101 may include multiplexer control 111, demultiplexer 112 and multiplexer 113, clock generator 114, signal generator 115, demodulation circuit 116, and analog-to-digital converter (ADC) 117. ADC 117 is further coupled with touch coordinate converter 118. Touch coordinate converter 118 outputs a signal to the processing logic 102. Processing logic may output to host 103 in one embodiment. In another embodiment, host 103 may receive data directly from ADC 117 or touch coordinate converter 118.

The transmit and receive electrodes in the matrix 110 may be arranged so that each of the transmit electrodes overlap and cross each of the receive electrodes such as to form an array of intersections, while maintaining galvanic isolation from each other. Thus, each transmit electrode may be capacitively coupled with each of the receive electrodes. For example, transmit electrode 122 is capacitively coupled with receive electrode 123 at the point where transmit electrode 122 and receive electrode 123 overlap.

Clock generator 114 supplies a clock signal to signal generator 115, which produces a TX signal 124 to be supplied to the transmit electrodes of touch sensor array 121. In one embodiment, the signal generator 115 includes a set of switches that operate according to the clock signal from clock generator 114. The switches may generate a TX signal 124 by periodically connecting the output of signal generator 115 to a first voltage and then to a second voltage, wherein said first and second voltages are different.

The output of signal generator 115 is connected with demultiplexer 112, which allows the TX signal 124 to be applied to any of the M transmit electrodes of touch sensor array 121. In one embodiment, multiplexer control 111 controls demultiplexer 112 so that the TX signal 124 is applied to each transmit electrode 122 in a controlled sequence. Demultiplexer 112 may also be used to ground, float, or connect an alternate signal to the other transmit electrodes to which the TX signal 124 is not currently being applied.

Because of the capacitive coupling between the transmit and receive electrodes, the TX signal 124 applied to each transmit electrode induces a current within each of the receive electrodes. For instance, when the TX signal 124 is applied to transmit electrode 122 through demultiplexer 112, the TX signal 124 induces an RX signal 127 on the receive electrodes in matrix 110. The RX signal 127 on each of the receive electrodes can then be measured in sequence by using multiplexer 113 to connect each of the N receive electrodes to demodulation circuit 116 in sequence. In one embodiment, multiple multiplexers may allow RX signals to be received in parallel by multiple demodulation circuits.

The mutual capacitance associated with each intersection between a TX electrode and an RX electrode can be sensed by selecting every available combination of TX electrode and an RX electrode using demultiplexer 112 and multiplexer 113. To improve performance, multiplexer 113 may also be segmented to allow more than one of the receive electrodes in matrix 110 to be routed to additional demodulation circuits 116. In an optimized configuration, wherein there is a 1-to-1 correspondence of instances of demodulation circuit 116 with receive electrodes, multiplexer 113 may not be present in the system.

When an object, such as a finger or stylus, approaches the matrix 110, the object causes a decrease in the mutual capacitance between only some of the electrodes. For example, if a finger or stylus is placed near the intersection of transmit electrode 122 and receive electrode 123, the presence of the finger will decrease the mutual capacitance between electrodes 122 and 123. Thus, the location of the finger on the touchpad can be determined by identifying the one or more receive electrodes having a decreased mutual capacitance in addition to identifying the transmit electrode to which the TX signal 124 was applied at the time the decreased mutual capacitance was measured on the one or more receive electrodes.

By determining the mutual capacitances associated with each intersection of electrodes in the matrix 110, the locations of one or more touch contacts may be determined. The determination may be sequential, in parallel, or may occur more frequently at commonly used electrodes.

In alternative embodiments, other methods for detecting the presence of a finger or conductive object may be used where the finger or conductive object causes an increase in capacitance at one or more electrodes, which may be arranged in a grid or other pattern. For example, a finger placed near an electrode of a capacitive sensor may introduce an additional capacitance to ground that increases the total capacitance between the electrode and ground. The location of the finger can be determined from the locations of one or more electrodes at which an increased capacitance is detected.

The induced current signal (RX signal 127) is rectified by demodulation circuit 116. The rectified current output by demodulation circuit 116 can then be filtered and converted to a digital code by ADC 117.

The digital code is converted to touch coordinates indicating a position of an input on touch sensor array 121 by touch coordinate converter 118. The touch coordinates are transmitted as an input signal to the processing logic 102. In one embodiment, the input signal is received at an input to the processing logic 102. In one embodiment, the input may be configured to receive capacitance measurements indicating a plurality of row coordinates and a plurality of column coordinates. Alternatively, the input may be configured to receive row coordinates and column coordinates.

In one embodiment, touch sensor array 121 can be configured to detect multiple touches. One technique for multi-touch detection uses a two-axis implementation: one axis to support rows and another axis to support columns. Additional axes, such as a diagonal axis, implemented on the surface using additional layers, can allow resolution of additional touches.

Figure 2:
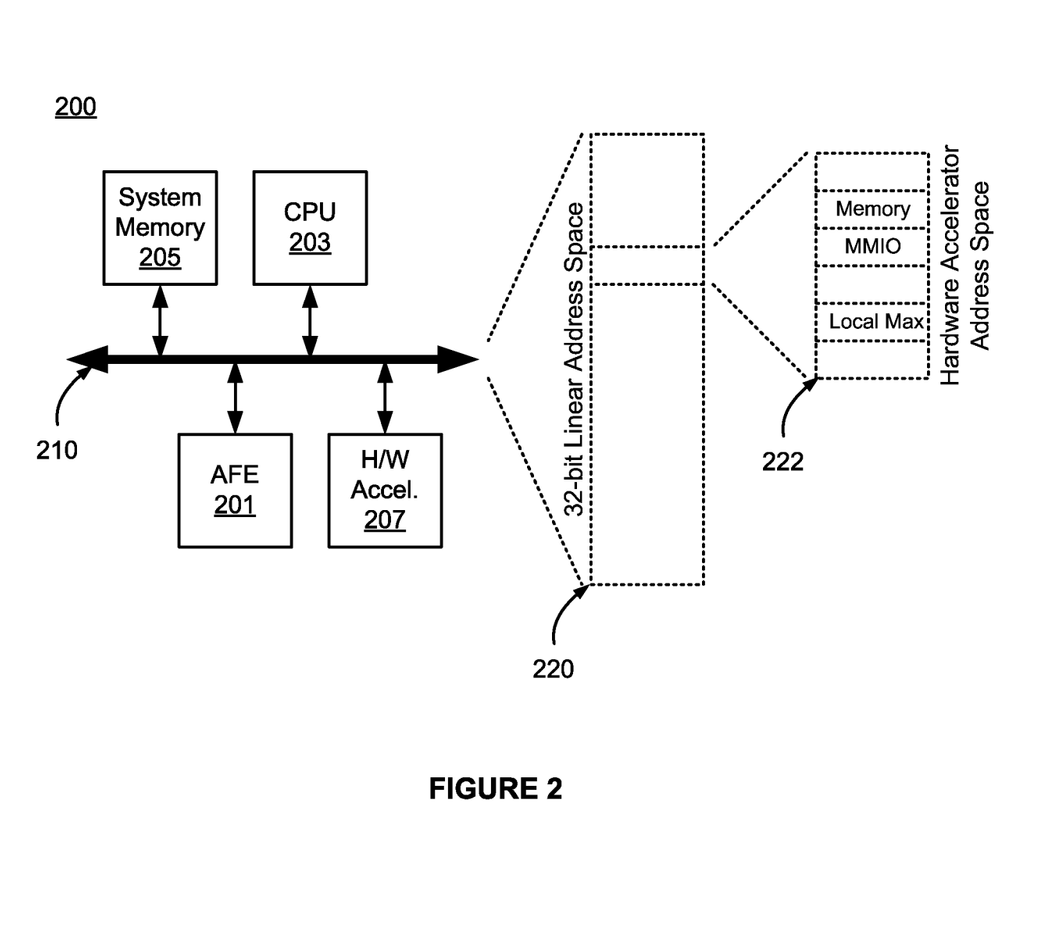
FIG. 2 illustrates an embodiment of system comprising a hardware accelerator.

FIG. 2 illustrates one embodiment of a touch sensing system 200 with a hardware accelerator for local maximum calculation. The touch sensing system 200 may include an analog front end (AFE) 201 coupled to a data bus 210. The analog front end may be similar to the circuit illustrated in FIG. 1 and comprising demultiplexers 112 and 113, multiplexor control 111, clock generator 114, signal generator 115, demodulation circuit 116, and a digital conversion similar to ADC 117. The analog front end may be configured to convert mutual capacitance that exists between transmit electrodes 122 and receive electrodes 123 of array 121 to digital values than may be stored in a memory array. Touch sensing system 200 may include a central processing unit (CPU) 203 configured to execute commands and control the AFE 201 as well as other circuits necessary for touch sensing operation. In one embodiment, the CPU may be configured to identify local maxima rather than of the hardware accelerator. In other embodiments, the CPU may be configured to execute capacitance baselining routines, adjust thresholds for noise and contact detection, identify and track contacts on the array 121, or process gestures. Program operations and commands, as well as capacitance data including raw values, baseline corrected values and any calibration information may be stored in system memory 205 and accessed by the CPU 203, AFE 201, hardware accelerator 207 or other system elements not shown through bus 210. Access and control of the several parts of touch sensing system may be accomplished by using a 32-bit address space 220, part of which is reserved for the hardware accelerator as the hardware accelerator address space 222.

Figure 3A:
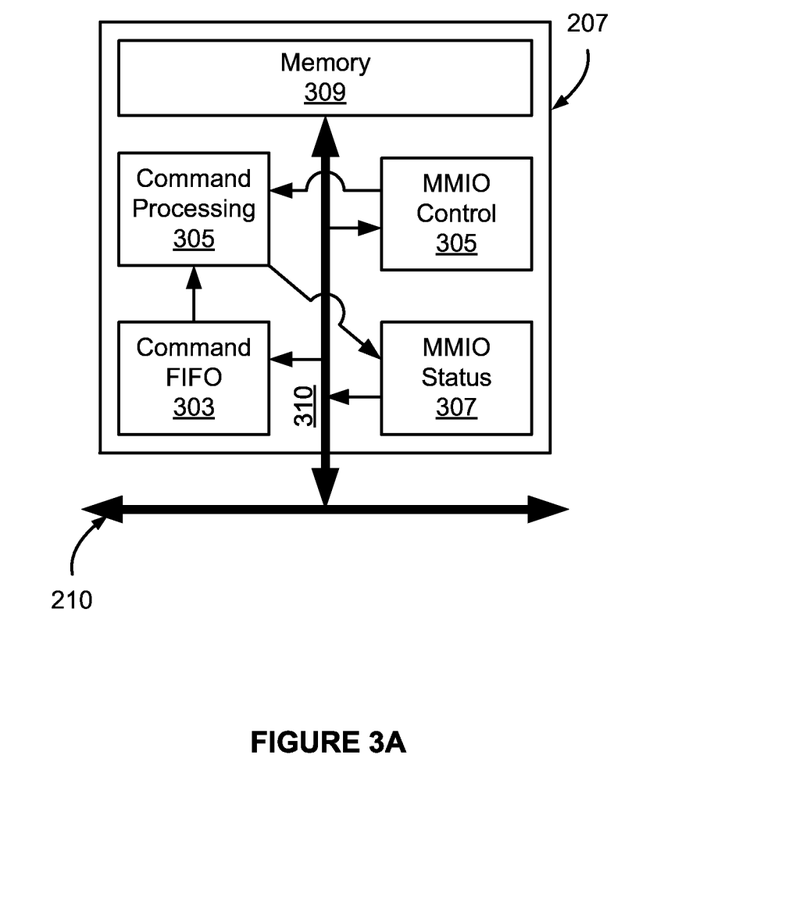
FIG. 3A illustrates a block diagram of one embodiment of a hardware accelerator.

FIG. 3A illustrates one embodiment of hardware accelerator 207 comprising a command processing module 301 configurable to process commands from command FIFO module 303. Command FIFO module 303 may be configured to receive commands from CPU 203 (FIG. 2) via hardware accelerator bus 310 and bus 210 and hold them in a queue for command processing module 305. Command processing module 305 many be configured to update memory mapped I/O (MMIO) status module 307 after receiving control information from MMIO control module 305. Command processing module 305 may also be the portion of the hardware accelerator configured fetch touch sensing array information from the system memory 205 (FIG. 2) and to perform the local maximum detection on those values. MMIO control module may receive control information from CPU 203 (FIG. 2) via hardware accelerator bus 310 and bus 210. MMIO status information may be passed to other modules within hardware accelerator 207 via hardware accelerator bus 310 or to other modules of the touch sensing system 200 (FIG. 2) through bus 210. Hardware accelerator 207 may comprise a memory array 309 configured to store the touch sensing array information to be processed for local maxima identification. While memory mapped IO is used in this embodiment, it is understood that this for purposes of explanation only. Any kind of IO may be used by the hardware accelerator.

Figure 3B:
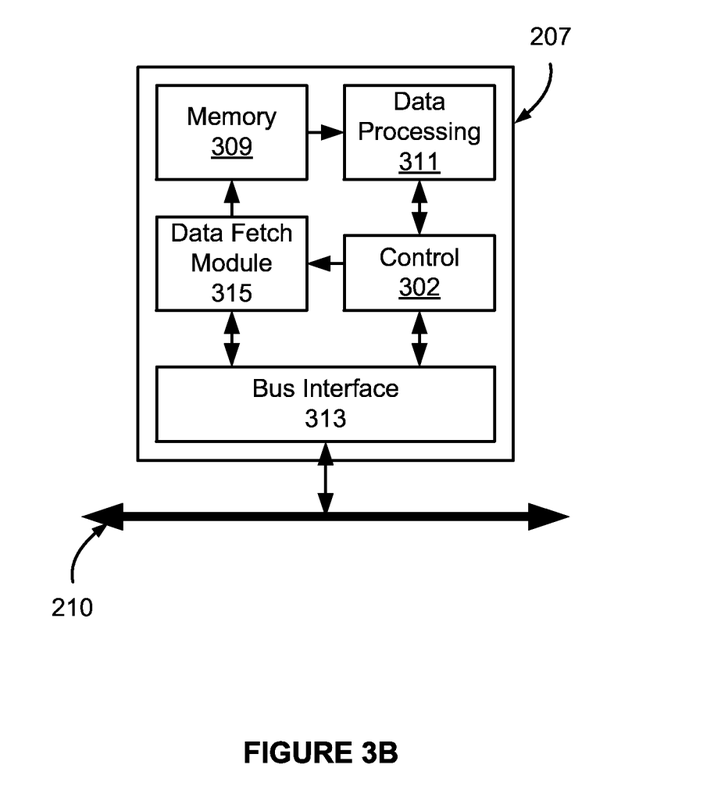
FIG. 3B illustrates a block diagram of one embodiment of a hardware accelerator.

FIG. 3B illustrates another embodiment of hardware accelerator 207 comprising a control module 302, which may include portions of the command processing module 301 and command FIFO module 303 of FIG. 3A. Control module 302 may send commands to data processing module 311 and data fetch module 315. Data fetch module 315 may be configured to access system memory array 305 through bus interface 313 and store touch sensing array information such as the measured capacitance values that are necessary for local maxima identification in memory array 309. Capacitance values may be any representation of capacitance on the capacitance sensor. In one embodiment, capacitance values may be linear measurements of accumulated voltage measured with the integration circuit. In another embodiment, the measured voltage on the integration circuit may be attenuated. In still another embodiment the capacitance value may be a digital representation of a capacitance similar to an output of an analog-to-digital converter. Data processing module 311, responding to commands from control module 302 may access memory array 309 to identify local maxima and pass them back to the touch sensing system 200 (FIG. 2) for storage in the system memory array 205 and additional processing through control module 302 and bus interface 313. Control module 302 may also receive additional commands or requests for local maxima locations through bus interface 313.

Figure 3C:
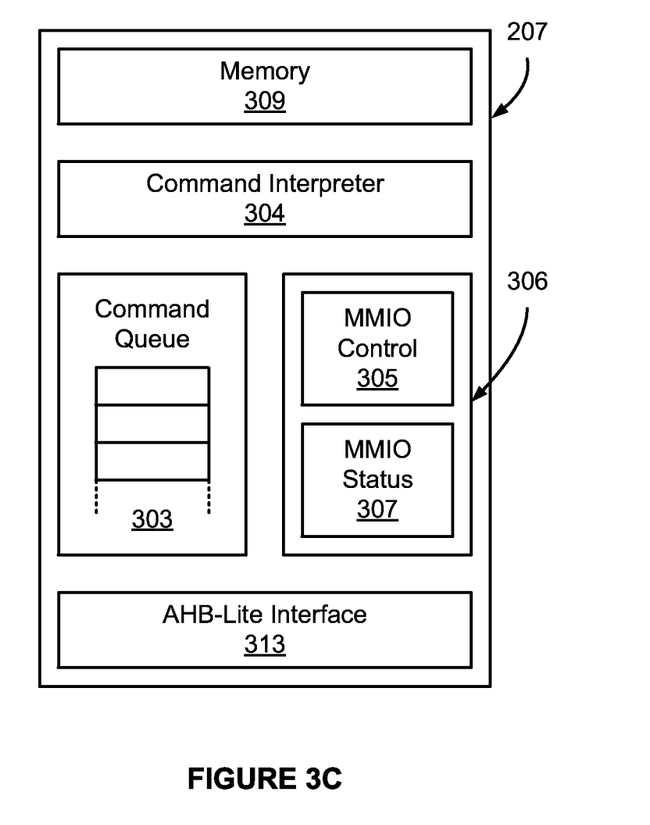
FIG. 3C illustrates a block diagram of one embodiment of a hardware accelerator.

FIG. 3C illustrates another embodiment of hardware accelerator 207 comprising a command queue 303 configured to store commands from the CPU and other system elements for processing by hardware accelerator 207. Command interpreter 304 may be configured to receive commands from the command queue 303 and to process them using information stored in memory array 309. Memory array 309 may be configured to store programming information for command interpreter 304 as well as capacitance map information necessary for identifying local maxima. Hardware accelerator 207 may also comprise MMIO module 306 comprising an MMIO control module and a MMIO status module each configurable to access and control the memory registers for commands necessary for hardware accelerator. Commands and information may be passed into and out of, as well as within the hardware accelerator through AHB-Light Interface 313.

The memory array 309 of hardware accelerator 207 may be accessed (both read and write) by multiple system elements simultaneously. In one embodiment, the memory array may be written to by the host controller and simultaneously read from by the hardware accelerator local maximum detection logic (described below). In another embodiment, the local maximum detection logic may write to memory array 309 such that an external element of system 200 may read locations of local maxima from memory array 309.

Hardware accelerator 207 may be used to detect local maxima on the capacitance sensing array. Local maxima may be indicative of touch locations may be used to calculate the precise location of at least one contact on the capacitance sensing array. The location of the at least one contact on the array capacitance sensing array may then be used to detect gestures, move a cursor across a display unit, or perform other user interface operations.

By performing the local maxima detection in the hardware accelerator rather than in the main program, other operations that may be necessary for touch sensing array operation may not be burdened by the local maxima detection may run separately. Additionally, the system memory array and CPU are available and unburdened since the hardware accelerator may use separate local memory and digital logic for performing necessary comparisons for local maxima detection.

Figure 4:
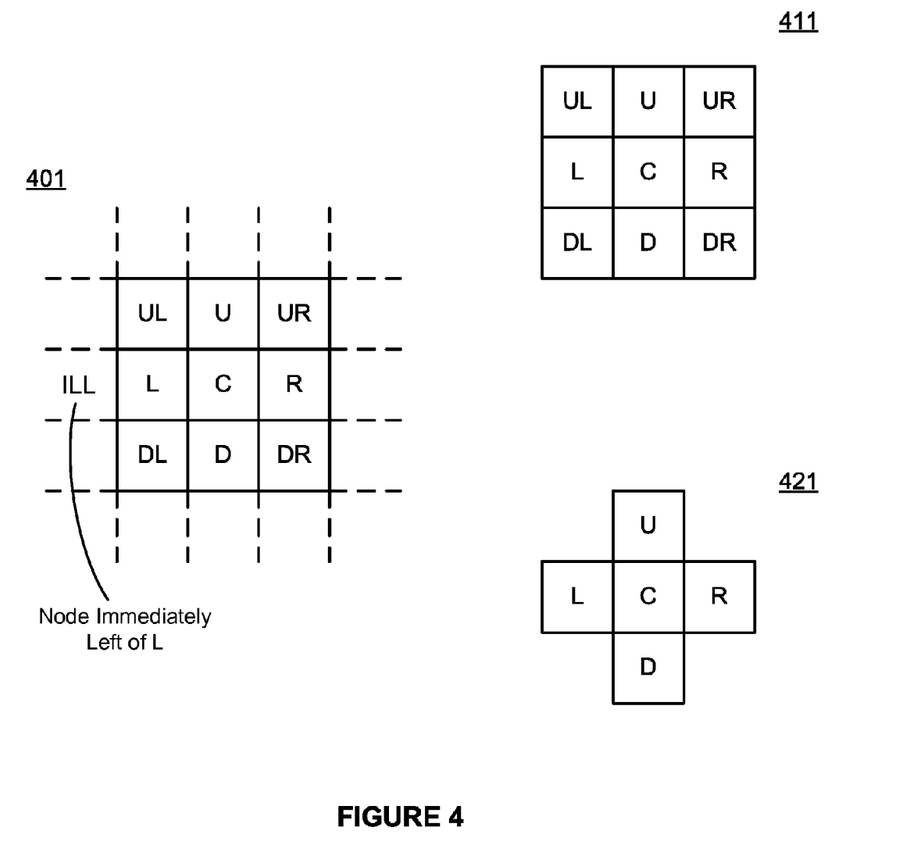
FIG. 4 illustrates embodiments of pluralities of nodes that may be processed by the hardware accelerator.

FIG. 4 illustrates one representation of the data that may be used in identifying local maxima with the hardware accelerator 207. Element 401 represents nine nodes around and including a center node, C, that are used in determining if the center node, C, is a local maximum. The value of the center node, C, is compared with each of the values for the nodes above, U, below, D, left, L, and right, R. The value of the center node, C, is also compared with each of the values for the nodes at the diagonals, UL, UR, DR, and DL. If the value of the center node is greater than each of the values for the eight nodes surrounding it, it is determined to be a local maximum. Element 411 shows the nine-node window that is used for determining whether the center node is a local maximum. Element 421 shows another embodiment where only the nodes above, below, left, and right of the center node are used in the determination of the center node as a local maximum. In another embodiment, only the nodes located diagonally from the center node may be used. In still another embodiment, a collection of nodes surrounding the center node that is greater in number than nine may be used.

If the center node is equal to one of the surrounding nodes, in one embodiment, the processing may look to the nodes on each side of the equal nodes to determine which of the equal nodes is the actual local maximum. That is, if both the center node, C, and the left node, L, both have the same value, a comparison may be made between the right node, R, and the node (ILL) immediately left of the left node, L. If R is greater, then C will be determined to be the center node as the sum of C and R is greater than the sum of L and the node ILL immediately to the left of L.

Figure 5:
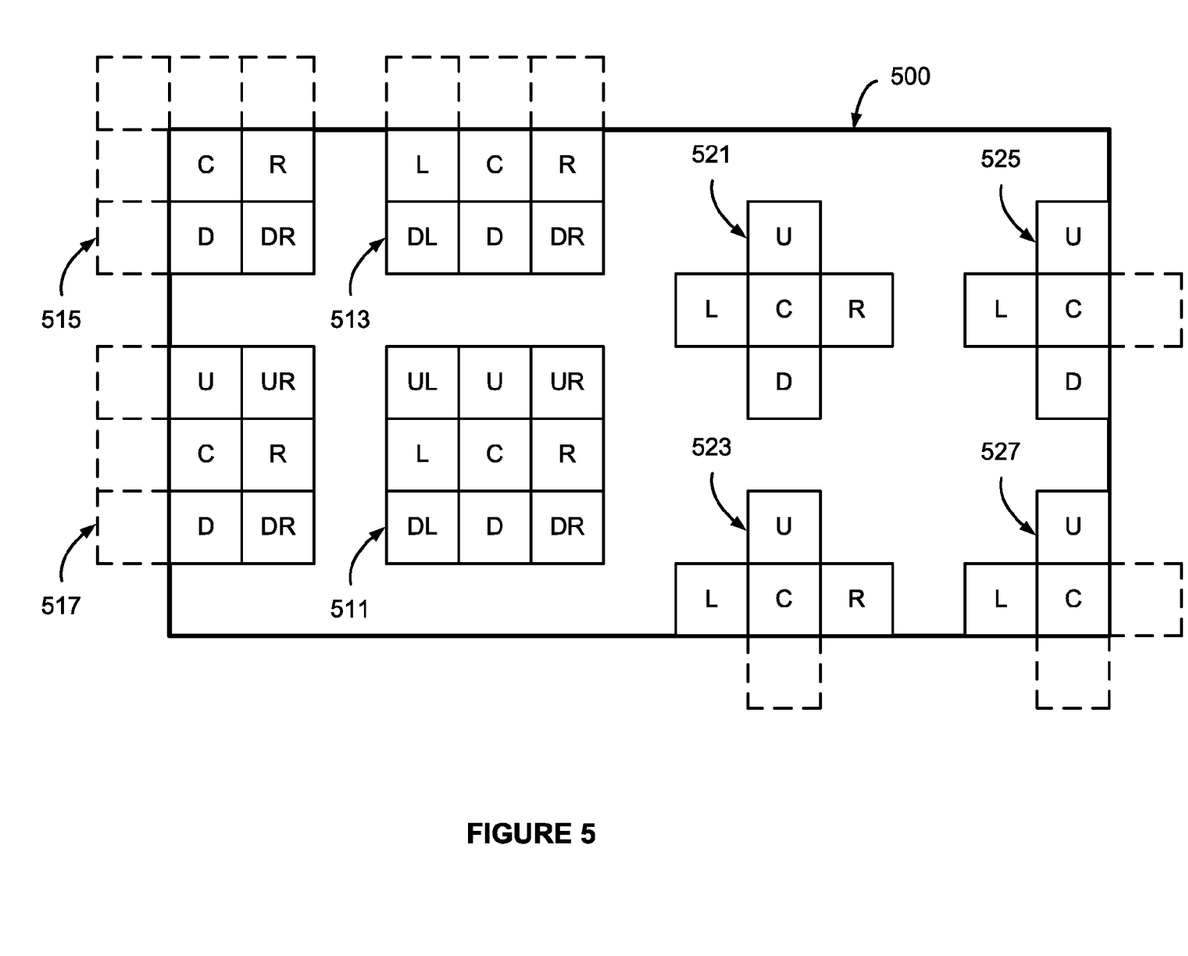
FIG. 5 illustrates embodiments of pluralities of nodes that may be processed by the hardware accelerator in various locations on a touch sensor array.

FIG. 5 illustrates the elements 411 and 421 of FIG. 4 as they may be found in an embodiment of an array of nodes, such as array 500. The elements 511 and 521 may be processed normally and all comparisons made between the surrounding nodes and the center node, C. However, if the node that is being processed is located on an edge of the array or in a corner, there are fewer nodes to compare to the center node. For example, element 513 does not have nodes UL, U, or UR. These are therefore excluded from the local maximum determination for center node C of element 513. Similarly for element 523, node U does not exist. It is excluded from the local maximum determination for center node C for element 523.

While the embodiments of FIGS. 4 and 5 illustrate the comparison of a center node to the surrounding nodes either in whole or in part, there exist other peak detection schemes based on signals of a node under test and parameters that determine its status as a peak. The embodiments of FIGS. 4 and 5, and their application in the embodiments below are intended to be representative of peak detection generally. Hardware accelerator 207 (FIGS. 2 and 3A-C) may be configured to process capacitance data for a plurality of nodes using any method, including but not limited to a logical comparison of a limited number of sensors, slope detection, and gradient detection. Additionally, the elements of FIGS. 4 and 5 show only two embodiments of groups of nodes that may be used for the comparison. Other embodiments comprising different collections of sensors may be used for the elements.

Figure 6:
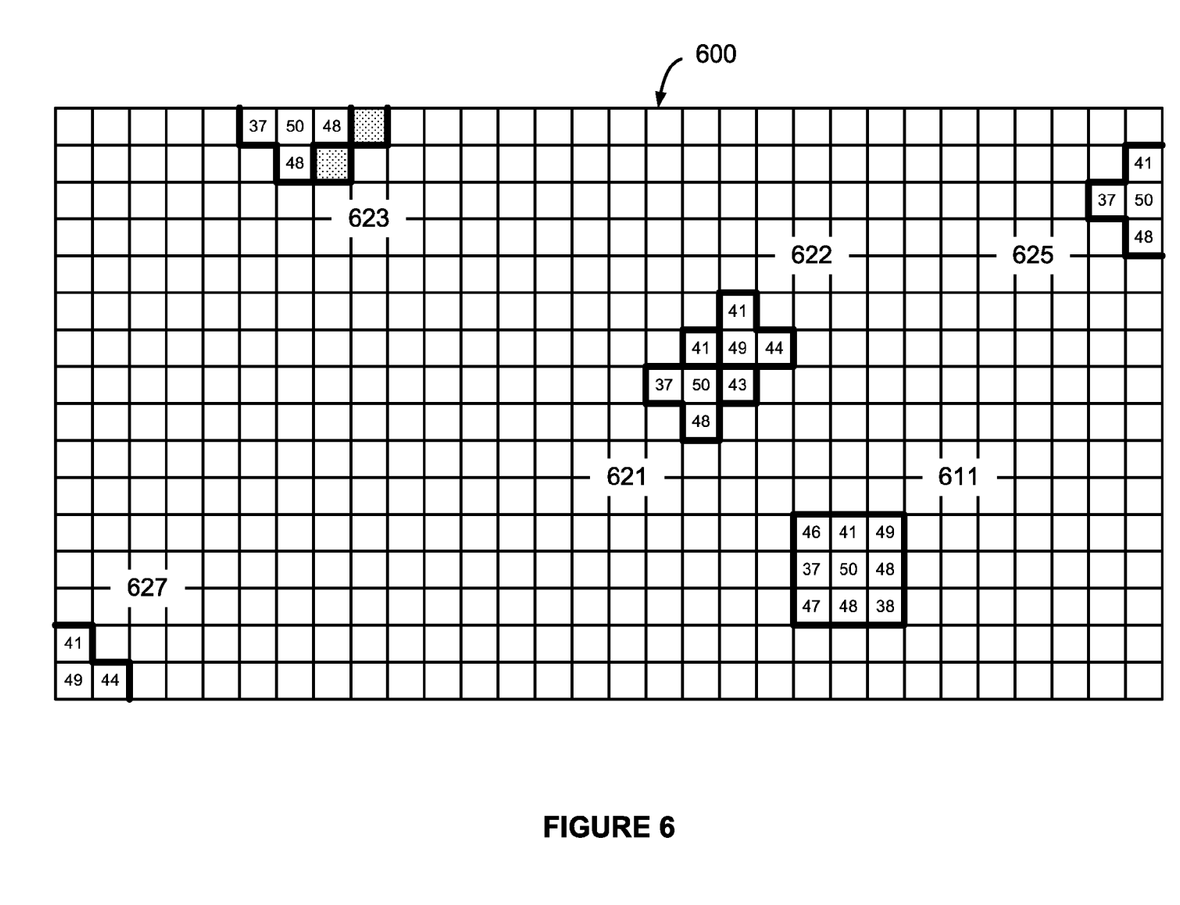
FIG. 6 illustrates embodiments of pluralities of nodes that may be processed by the hardware accelerator and the values at each node that may be processed.

FIG. 6 illustrates an embodiment of several elements as described in FIGS. 4 and 5 in a 30×21 node array. The values that are used in the determination of the center nodes of each are displayed. The center node for element 623 has a value of 50. When compared to the ride node (37), the left node (48) and the lower node (48), the center of element 623 is determined to be a local maximum. If a similar comparison was to be made wherein the right node of element 623 was the center, the comparison would show that the center node was not the local maximum. Similar comparisons as were made for element 623 may be made for elements 611, 625 and 627. Element 611 uses a comparison of the center node, C, with a value of 50 to all of the nodes surrounding it. Because 50 is greater than all the values for the surrounding nodes, it is determined to be the local maximum.

621 and 622 share some nodes that may be used in determining whether each is a local maximum. The right node (43) of 621 is the same as the lower node of 622. Similarly, the upper node (41) of element 621 is the same as the left node of 622. The comparison of each of the center nodes to the four nodes in each of the cardinal directions yields two local maxima. However, if a nine-node comparison were to be used as discussed above, the local maximum of element 622 would not be detected since its value is lower than the value of the center of element 621.

Figure 7:
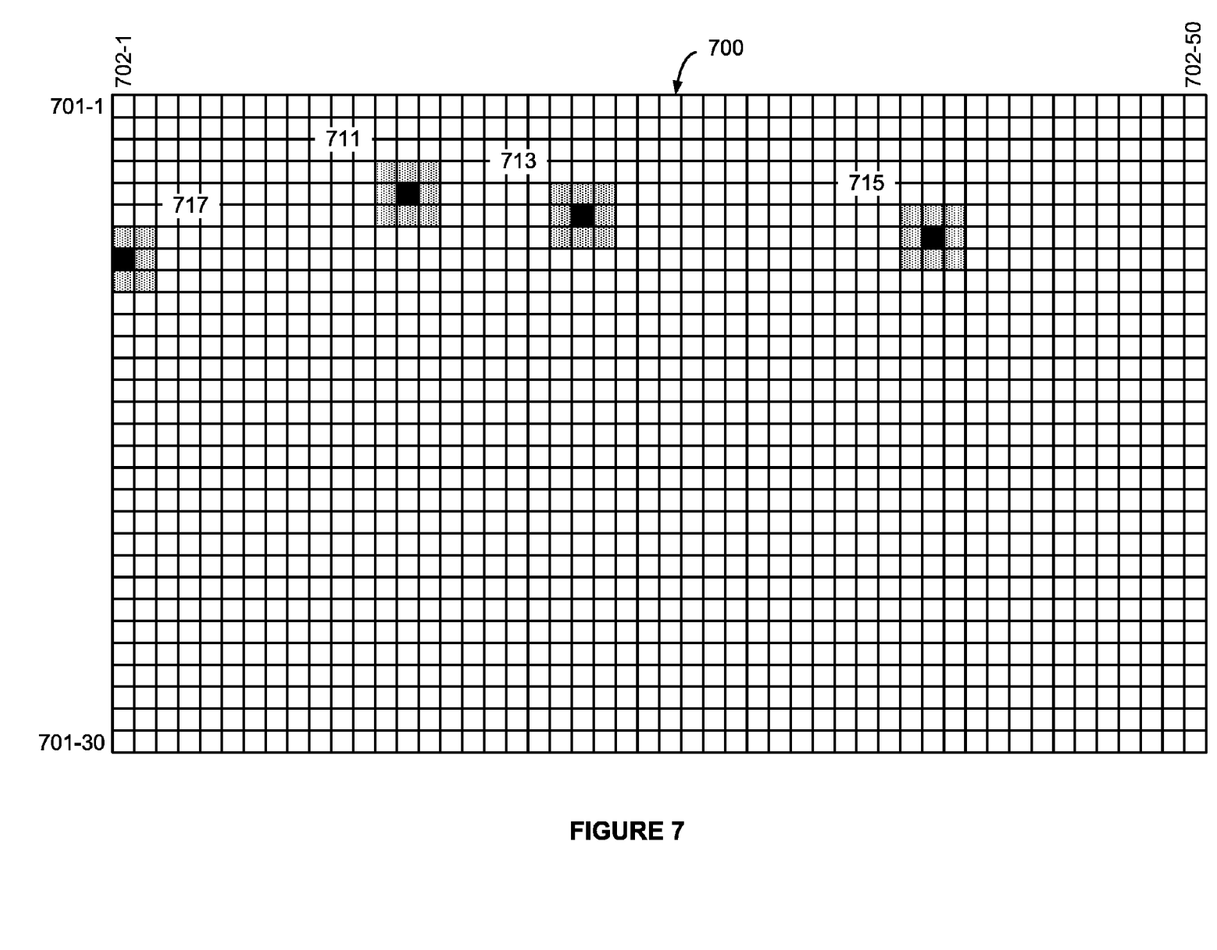
FIG. 7 illustrates an 50×30 array of nodes than may be processed by the hardware accelerator and four touches on the touch sensor array.

FIG. 7 illustrates an embodiment of a touch sensor array 700 that has 50 rows and 30 columns. The touch sensor array has 30 rows starting with row 701-1 and ending with 701-30. The touch sensor array 700 has 50 columns starting with column 702-1 and ending with column 702-50. For each node of touch sensor array there may multiple values stored, including the raw values of measured capacitance that are output from ADC 117 of FIG. 1, baseline correction factors that may be used to eliminate parasitic capacitance, noise thresholds for various types of noise, and difference counts from the baseline capacitance and the measured capacitance for a specific scan and most recent scan of the array. It is the difference counts that are most effectively used in the determination of local maxima since they are representative of only the change in capacitance that is caused by the presence of a conductive object.

In one embodiment, the hardware accelerator may be used to find any local maxim in row 701-5. To do this, the hardware accelerator may fetch the difference counts from the system memory array 205 and storing that value in a local memory array 309 (FIGS. 3A-C). In one embodiment, since the hardware accelerator uses the nodes in the rows immediately above and below the node to be processed, difference count values for rows 701-4 and 701-6 may also be fetched from the system memory array 205 and stored in local memory array 309.

Local memory array 309 may be a 256-byte memory array 800 as shown in FIGS. 8A-D. In the embodiment shown in FIG. 8A, the data from rows 701-4 through 701-6 may be stored in the first available bytes. The hardware accelerator may then use nodes 711-1 through 711-3, 711-4 through 711-6, and 711-7 through 711-9 to determine if node 711-5 is a local maxima. In one embodiment, the values that are fetched from the system memory array 205 sent to or written to the local memory array 309 of hardware accelerator 207 are shown as window 811.

Figure 8A:
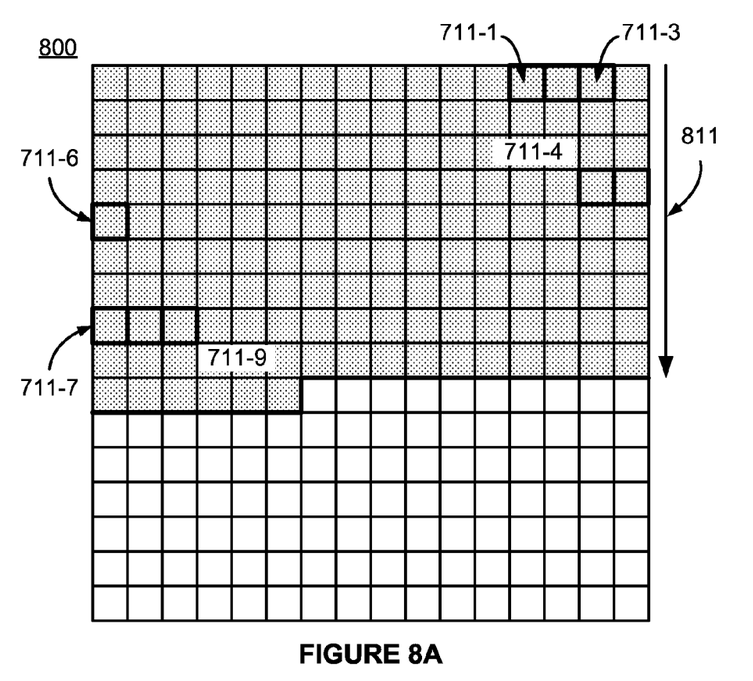
FIG. 8A illustrates an example of the memory used to process the first touch of FIG. 7.
Figure 8B:
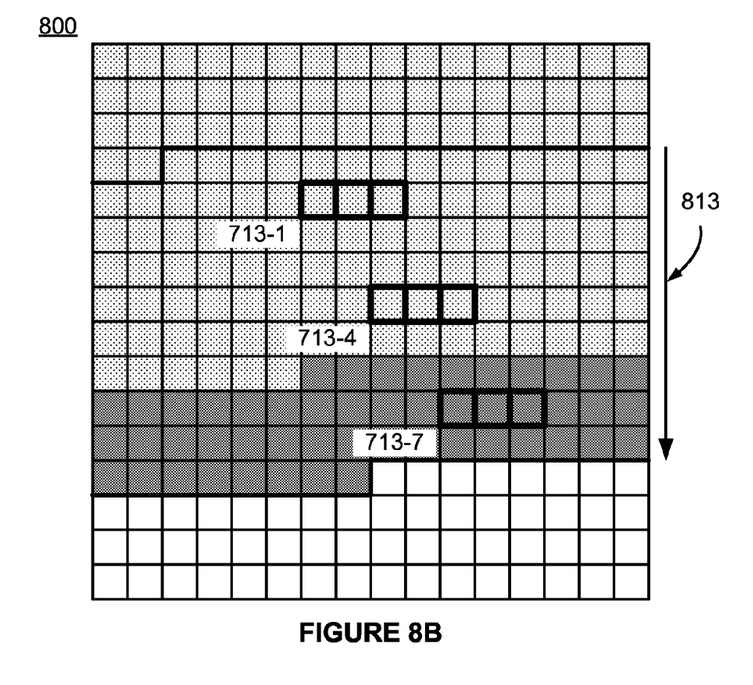
FIG. 8B illustrates an example of the memory used to process the second touch of FIG. 7.

To determine if the center node of element 713 of FIG. 7 is a local maximum an additional row of values 701-7 is required, while row 701-4 is no longer required. Therefore, the hardware accelerator fetches the additional data and stores it in the next available memory cells of memory array 800 as shown in FIG. 8B. The window of values 813 is then used to determine if node 713-5 is a local maximum by comparing nodes 713-1 through 713-3, 713-4 through 713-6, and 713-7 through 713-9. The 50 new values are copied into the next available memory cells, requiring an additional 50 bytes.

Figure 8C:
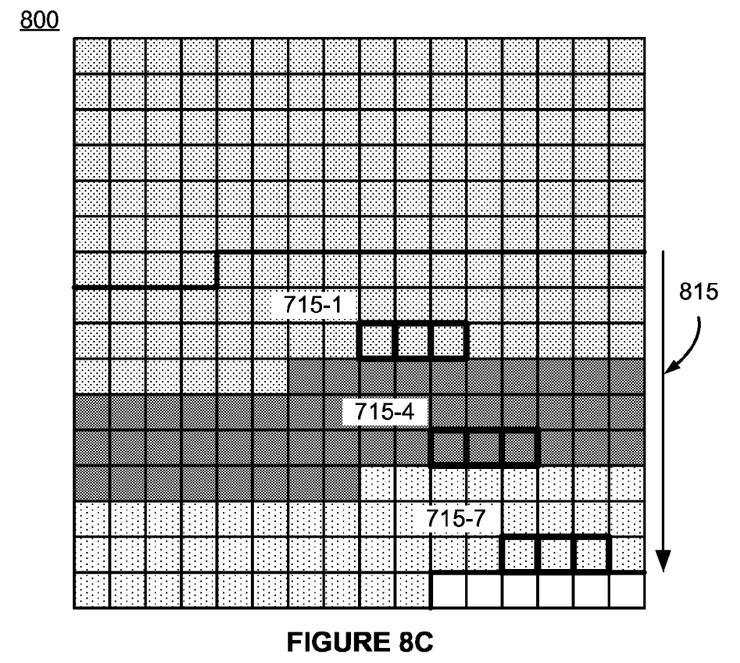
FIG. 8C illustrates an example of the memory used to process the third touch of FIG. 7.

To determine if the center node of element 715 of FIG. 7 is a local maximum an additional row of values 701-8 is required, while row 701-5 is no longer required. Therefore, the hardware accelerator fetches the additional data and stores it in the next available memory cells of memory array 800 as shown in FIG. 8C. The window of values 815 is then used to determine if node 715-5 is a local maximum by comparing nodes 715-1 through 715-3, 715-4 through 715-6, and 715-7 through 715-9. The 50 new values are copied into the next available memory cells, requiring an additional 50 bytes.

Figure 8D:
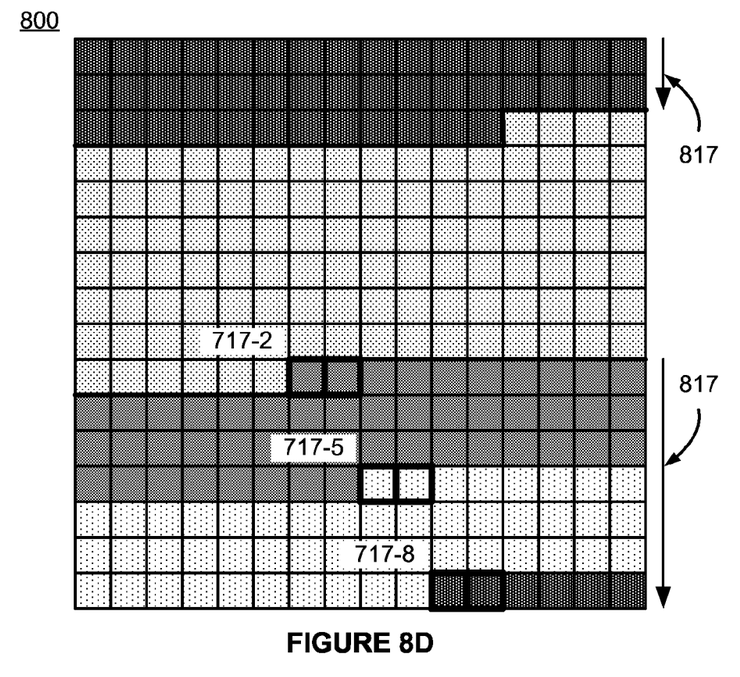
FIG. 8D illustrates an example of the memory used to process the second touch of FIG. 7.

To determine if the center node of element 715 of FIG. 7 is a local maximum an additional row of values 701-9 is required, while row 701-6 is no longer required. Therefore, the hardware accelerator fetches the additional data and stores it in the next available memory cells of memory array 800 as shown in FIG. 8D. Because the local memory 309 is now full, only the last six empty bytes are stored without overwriting data. The first 44 bytes of memory array 800 are then overwritten with the remaining values for row 701-9 because the values for 701-4 needed, as stated previously. The window of values 817 is then used to determine if node 717-5 is a local maximum by comparing nodes 717-2 and 717-3, 717-5 and 717-6, and 717-8 and 717-9. Because element 717 is located at the edge of the array, there are no nodes for UL, L, and DL as shown as element 517 in FIG. 5.

The hardware accelerator looks at each node that is in the row to be processed and then fetches the next row of data. That is, if the necessary data is already in the hardware accelerator local memory array 309, there is no need for a fetching operation to get values from the system memory array 205. This accelerates the local maximum identification process.

Figure 9:
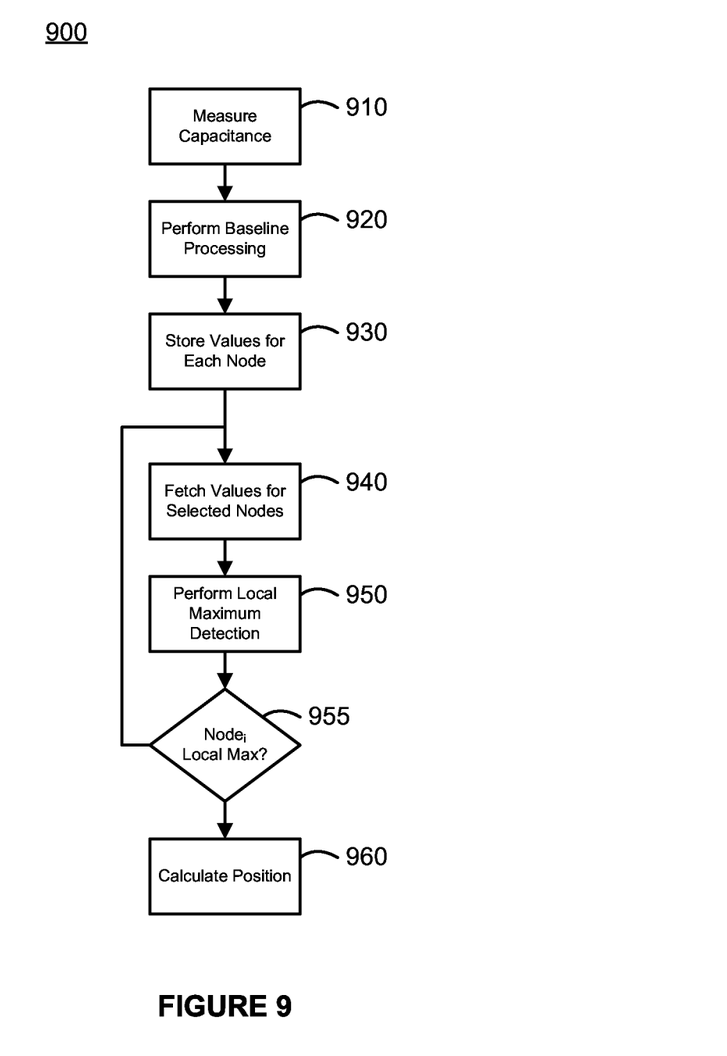
FIG. 9 illustrates one embodiment of a method for sensing a capacitance sense array and determining position of contacts thereon.

One embodiment of the overall method 900 for scanning a panel and determining local maxima by the system illustrated in FIG. 2 is shown in FIG. 9. The capacitance sensing array is first scanned and capacitance measured in step 910. The scanning may be completed by the capacitance sensor of FIG. 1. Baseline processing of the raw values from ADC 117 may then be performed in step 920. While baseline processing is listed, any processing that is not dependent on the identification of local maxima may be performed in this step. This includes noise detection and avoidance, median filtering, and other global operations. Difference counts may be then stored in a system memory array in step 930, the difference values representative of the change in capacitance of each node from a stored baseline value. While difference counts are used for this embodiment, any digital representation of the capacitance for the nodes may be calculated, stored, and used by the hardware accelerator 207. The hardware accelerator 207 may then fetch the difference values for the necessary rows in step 940 and store those values in local memory array 309. Local maxima may then be determined in step 950 according to the FIGS. 5-8 and the associated description. Local maxima may be stored in separate memory cells within the hardware accelerator local memory array 309 or sent to the touch sensing system for storage in another memory array, such as system memory array 205. In decision step 955, the hardware accelerator checks to see that the entire touch sensing array has been processed. If it has not the next row of values is fetched from system memory array 205 and stored in hardware accelerator local memory array 309 so that the next row may be processed according to FIGS. 7 and 8A-D. If the entire touch sensing array has been processed, the hardware accelerator may then communicate to the CPU or other processing circuit in touch sensing system 200 that the position of each contact that is identified by the local maxima may be calculated. In one embodiment, this may be done by touch coordinate converter 118 of FIG. 1.

There are many touch coordinate conversion methods that may be used in block 960, including but not limited to: centroid calculation, linear interpolation, Gaussian curve processing, virtual mass, method of borders, gradients, etc. Operation of the hardware accelerator is not dependent on any specific touch coordinate conversion method. Rather, the hardware accelerator tells the touch coordinate conversion method which data are to be used in determining the position of contacts on the touch sensing array.

Figure 10:
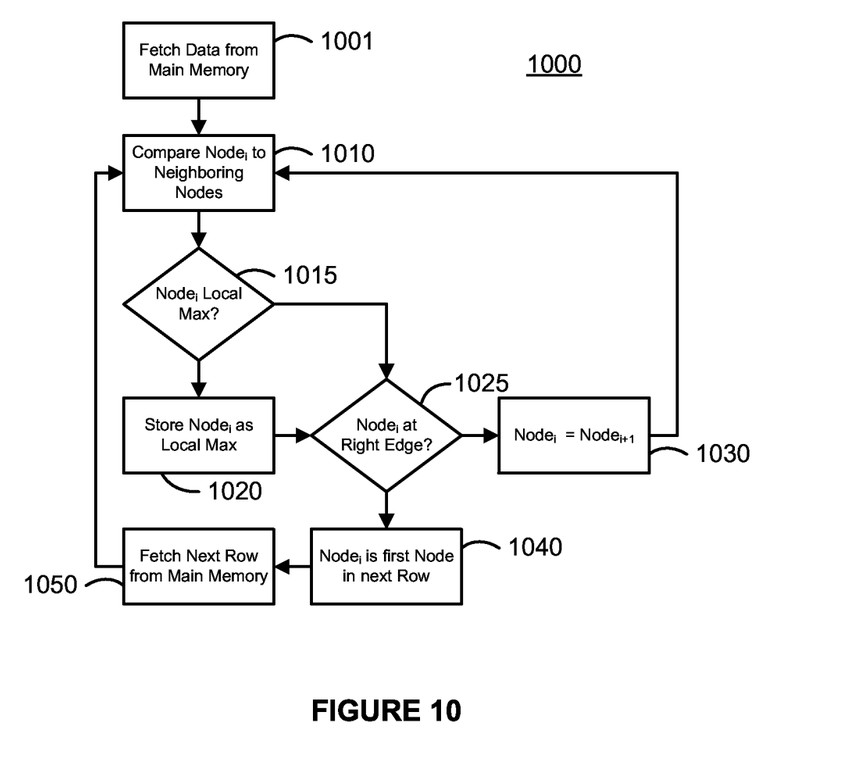
FIG. 10 illustrates one embodiment of a method identifying local maxima by the hardware accelerator.

FIG. 10 illustrates one embodiment of the method 1000 of processing values with the hardware accelerator. First, data is fetched from the system memory array in step 1001. This is similar to the fetch values step 940 of FIG. 9. Next, each node, $Node_i$, is compared to the neighboring nodes. This is represented by the center node, C, of FIG. 4 compared to the surrounding nodes of elements 411 and 421 in step 1010. The comparison may be accomplished by comparing each of the nodes surrounding $Node_i$. This may be done by comparing $Node_i$ to the eight nodes around it as shown in element 411 in FIG. 4, it may be performed by comparing $Node_i$ to only the nodes in cardinal directions from $Node_i$ as shown in element 421, or it may be performed by comparing a different set of nodes representative of the surrounding nodes to $Node_i$. If $Node_i$, is a local maximum, that node is stored as such in a memory array (e.g., memory array 309 of FIGS. 3A-C or directly to system memory 205 of FIG. 2) in decision step 1015. If it is not, or after $Node_i$ is stored as the local maximum, decision block 1025 determines if $Node_i$ is on the right edge of the touch sensing array (e.g., node C of elements 525 and 527 of FIG. 5, or the intersection of column 702-50 and any of the rows of FIG. 7). If it is not, the next node to the right, $Node_{i+1}$ becomes $Node_i$ in step 1030 and the method restarts at step 1010. If $Node_i$ is at the right edge of the touch sensing array, the first node (left-most node) of the next row becomes $Node_i$ in step 1040 and the next row of data is fetched from the system memory array (e.g., system memory 205 of FIG. 2) and stored in the hardware accelerator local memory array (e.g., memory array 309 of FIGS. 3A-C??) in step 1050 and the method restarts again at step 1010.

While only the local maximum detection is described in the executed commands of the hardware accelerator, other tasks may also be performed. These may include baseline calculation, difference count processing, or other basic mathematical operations. The commands for these operations may be loaded into command FIFO 303 and processed by command processing module 305 of FIG. 3A. They may be also handled by data processing module 311 of FIG. 3B or command queue 303 and command processor 304 of FIG. 3B.

Certain embodiments may be implemented as a computer program product that may include instructions stored on a computer-readable medium. These instructions may be used to program a general-purpose or special-purpose processor to perform the described operations. A computer-readable medium includes any mechanism for storing or transmitting information in a form (e.g., software, processing application) readable by a machine (e.g., a computer). The computer-readable storage medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory, or another type of medium suitable for storing electronic instructions.

Additionally, some embodiments may be practiced in distributed computing environments where the computer-readable medium is stored on and/or executed by more than one computer system. In addition, the information transferred between computer systems may either be pulled or pushed across the transmission medium connecting the computer systems.

Although the operations of the method(s) herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

What is claimed is:

1. A method of local maximum calculation for a touch sensing system, comprising:
    at a hardware accelerator including a local memory array, wherein the hardware accelerator is distinct from a central processing unit (CPU) that is configured to execute commands and control an analog front end of the touch sensing system:
        fetching a plurality of capacitance values corresponding to nodes of a grid of nodes of a capacitance sense array;
        storing the plurality of capacitance values in the local memory array;
        selecting a center node in a window of nodes within the grid of nodes, the center node having a second capacitance value, wherein the window of nodes includes a first number of nodes that is less than a total number of nodes in the grid;
        identifying a first node adjacent to the center node along an axis and having a first capacitance value;
        after determining that the first capacitance value of the first node is equal to the second capacitance value of the center node:
            identifying a third node and a fourth node in the window of nodes, wherein the third node is adjacent to the first node along the axis and has a third capacitance value, and the fourth node is adjacent to the center node along the axis and has a fourth capacitance value;
            comparing the third capacitance value of the third node to the fourth capacitance value of the fourth node;
            in accordance with a determination that the third capacitance value is less than the fourth capacitance value, determining that the center node is the local maximum of the window of nodes; and
            in accordance with a determination that the third capacitance value is greater than the fourth capacitance value, determining that the first node is the local maximum of the window of nodes.

2. The method of claim 1, wherein the first node is located in a cardinal direction of the center node.

3. The method of claim 2, wherein the axis is a cardinal axis relative to the center node.

4. The method of claim 1, wherein the first node is located in a diagonal direction of the center node.

5. The method of claim 4, wherein the axis is a diagonal axis relative to the center node.

6. The method of claim 1, wherein the storing the plurality of capacitance values comprises storing the plurality of capacitance values in a plurality of next available cells of the memory array.

7. An apparatus comprising:
    a capacitive sense array configured to receive a plurality of capacitance values corresponding to nodes of a grid of nodes;
    a processing device, coupled to the capacitive sense array, wherein the processing device is distinct from a central processing unit (CPU) that is configured to execute commands and control an analog front end, and the processing device is configured to:
        fetch the plurality of capacitance values corresponding to nodes of the grid of nodes of a capacitance sense array;
        store the plurality of capacitance values in a memory array;
        select a center node in a window of nodes within the grid of nodes, the center node having a second capacitance value, wherein the window of nodes includes a first number of nodes that is less than a total number of nodes in the grid;
        identify a first node adjacent to the center node along an axis and having a first capacitance value;
        after determining that the first capacitance value of the first node is equal to the second capacitance value of the center node:
            identify a third node and a fourth node in the window of nodes, wherein the third node is adjacent to the first node along the axis and has a third capacitance value, and the fourth node is adjacent to the center node along the axis and has a fourth capacitance value;
            compare the third capacitance value of the third node to the fourth capacitance value of the fourth node;
            in accordance with a determination that the third capacitance value is less than the fourth capacitance value, determine that the center node is the local maximum of the window of nodes; and
            in accordance with a determination that the third capacitance value is greater than the fourth capacitance value, determine that the first node is the local maximum of the window of nodes.

8. The apparatus of claim 7, wherein the first node is located in a cardinal direction of the center node.

9. The apparatus of claim 8, wherein the axis is a cardinal axis relative to the center node.

10. The apparatus of claim 7, wherein the first node is located in a diagonal direction of the center node.

11. The apparatus of claim 10, wherein the axis is a diagonal axis relative to the center node.

12. The apparatus of claim 7, wherein the processing device is further configured to store the plurality of capacitance values in a plurality of next available cells of the memory array.

* * * * *